No. 871,277. PATENTED NOV. 19, 1907.
A. T. JOHNSON.
PRESSURE REDUCING VALVE.
APPLICATION FILED MAR. 6, 1907.

2 SHEETS—SHEET 1.

WITNESSES:
G. A. Taylor.
J. A. Stevens

INVENTOR
Andrew T. Johnson
BY
Key Pittman & Walter Shelton,
ATTORNEYS.

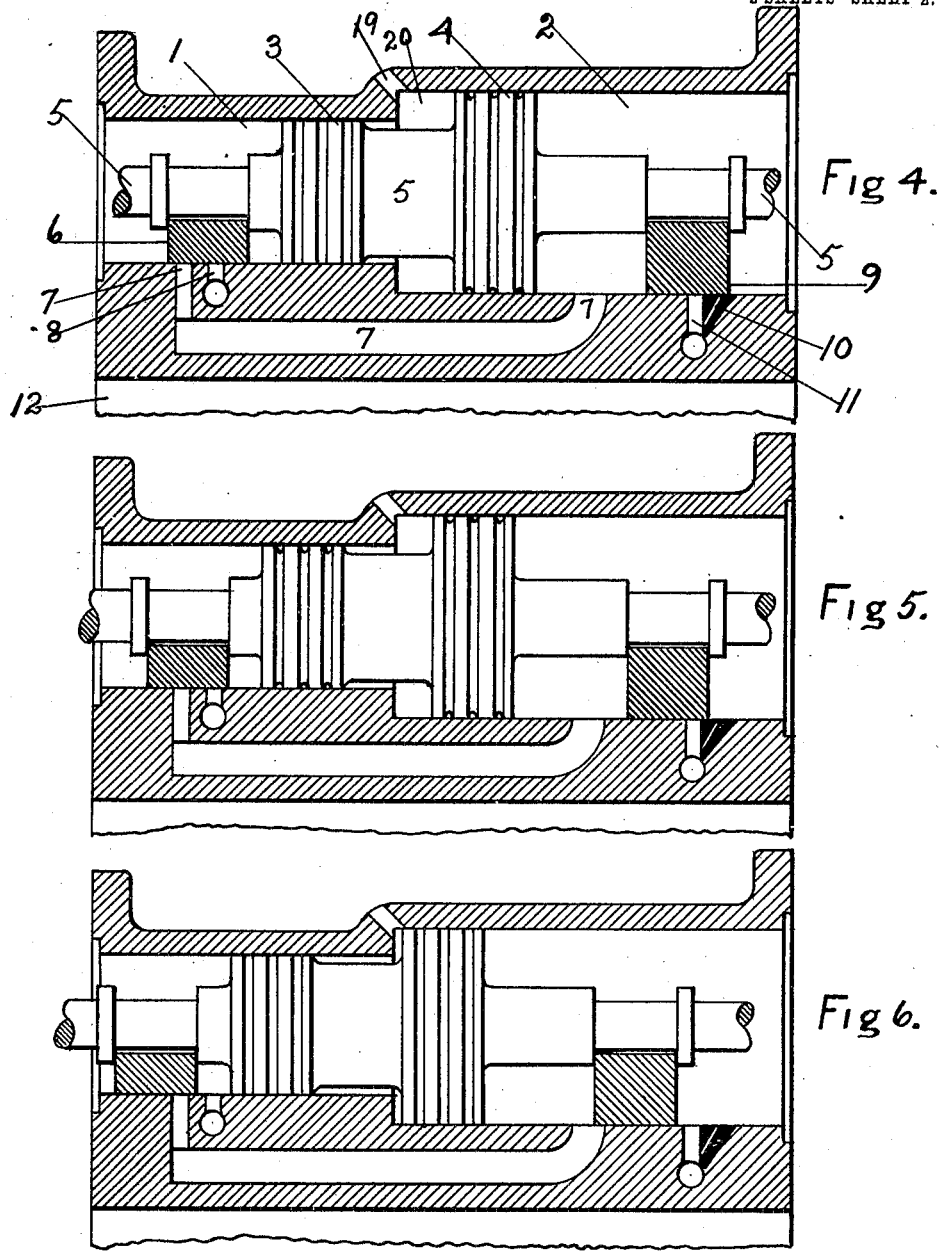

UNITED STATES PATENT OFFICE.

ANDREW T. JOHNSON, OF TONOPAH, NEVADA.

PRESSURE-REDUCING VALVE.

No. 871,277.  Specification of Letters Patent.  Patented Nov. 19, 1907.

Application filed March 6, 1907. Serial No. 360,997.

*To all whom it may concern:*

Be it known that I, ANDREW T. JOHNSON, a citizen of the United States, residing at Tonopah, Nye county, State of Nevada, have invented a new and useful Automatic Pressure-Reducing Valve, of which the following is such a full, clear, and exact description as will enable any one skilled in the art to which it appertains to make and use the same, reference being had to the accompanying drawings.

My invention relates to improvements in automatic pressure reducing valves to be used in the cross-over pipe of air-brake apparatus on cars, and other suitable places; and the objects of my invention are: First. To regulate the braking power applied to each car in a train in proportion to its weight, making it possible to use only so much braking power as is effective on light-weight cars, thereby preventing the sliding or skidding of their wheels while a maximum braking power is applied on loaded or heavy-weight cars; Second. To make an emergency application of the brakes on rear cars in long trains at practically the same instant they are applied on head-end cars by allowing the air to escape into atmosphere at my valve when a pressure reduction is made instead of escaping only at the locomotive; and by the same means to prevent the air in the rear of the train pipe from rushing forward and increasing the pressure in the front end of the train line, thereby releasing the brakes on the head-end cars, which had already gone into emergency as a result of the sudden pressure reduction; also to allow the pressure reduction to continue in case the engineer should return his brake valve to lap position too soon; Third. To make a more effective additional service application of the brakes without releasing them by assisting to make a sudden pressure reduction in the same manner as when an emergency application is made; Fourth. When a service application is made and a defective triple valve on any car using my invention goes into emergency, to release from emergency application the brakes controlled by such defective triple without throwing other triple valves into emergency.

I attain the foregoing objects by the mechanism illustrated in the accompanying drawings which are diagrammatic.

Figure 1:
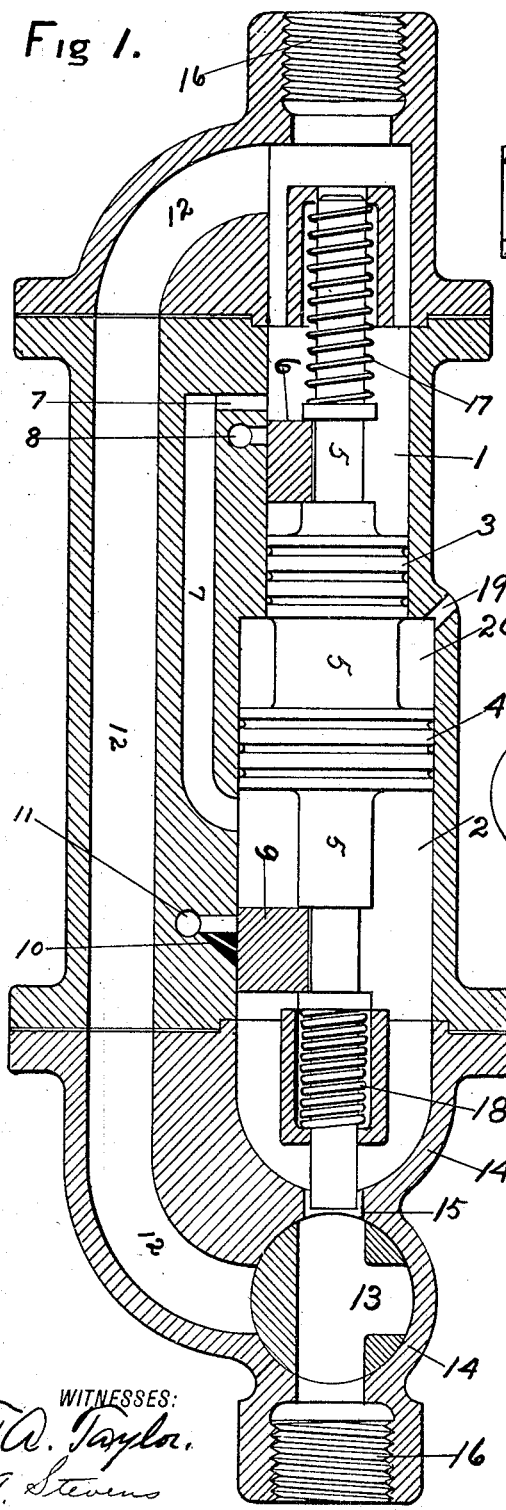
Figure 3:
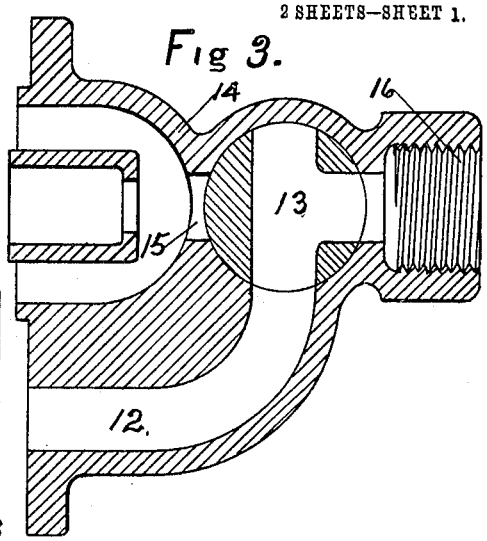
Figure 2:
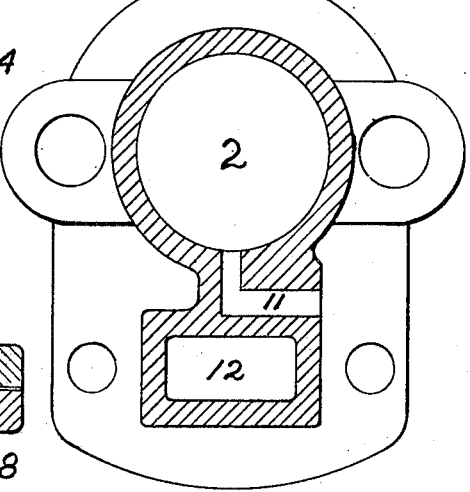

Figure 1 is a vertical longitudinal section showing my valve in charging position; Fig. 2 is a vertical cross section through emergency port 11; Fig. 3 is a reproduction of cylinder head 14 shown in Fig. 1 showing 3-way valve 13 closing air passage 15 and opening air passage 12 for high pressure; Fig. 4 is also a vertical longitudinal section showing my valve in lap position; Fig. 5 is the same showing parts in graduated or service application position; and Fig. 6 is same showing parts in emergency application position.

Similar numbers refer to similar parts throughout the several views.

1 represents a small or high pressure cylinder; 2, a large or low pressure cylinder situated with reference to cylinder 1 so that their centers form a continuous straight line; 3, a small piston operating air-tight in high pressure cylinder 1; 4, a large piston operating air-tight in low pressure cylinder 2; 5, a piston stem or rod upon which pistons 3 and 4 are immovably mounted so as to operate in conjunction with each other; 6 represents a slide valve joined to piston stem 5 and controlled by it so as to open and close feed port 7 and emergency port 8; feed port 7 which is larger than the feed port but smaller than the emergency port of the triple valve serves as a means of communication between high pressure cylinder 1 and low pressure cylinder 2, opening on one side of piston 3 and on the opposite side of piston 4 and allowing the compressed air to enter cylinder 2 in such manner as to exert pressure on piston 4 in a direction opposite to the direction of the pressure exerted on piston 3; emergency port 8 serves as a duct through which to discharge the air from high pressure cylinder 1 into atmosphere; 9 is a second slide valve also joined to piston rod 5 and controlled by it so as to open and close graduated port 10 and emergency port 11; graduated or service port 10 is a very small duct communicating with cylinder 2 and atmosphere and is milled out at its entrance where slide valve 9 moves in such shape as to be uncovered gradually by said slide valve 9 and permit only a very gentle or graduated reduction of the pressure; emergency port 11 which is smaller than the emergency port 8, also leads from low pressure cylinder 2 to atmosphere and is of sufficient size to permit a sudden or emergency reduction of the pressure in cylinder 2 and connected chambers.

12 represents an air passage to be used when applicant's mechanism is cut out on heavy-weight cars by means of 3-way valve 13 situated in head 14 of low pressure cylinder 2 and so constructed that turning it so as to close air passage 12 opens air passage 15 leading from low pressure cylinder 2 to cross-over pipe 16, and vice versa; 17 is a coil spring serving as a cushion for piston rod 5 when the parts go into emergency position as shown in Fig. 6; 18 is another coil spring also serving as a cushion for piston rod 5 when the parts go into charging position as shown in Fig. 1; springs 17 and 18 also hold the movable parts 3, 4, 5, 6 and 9 in lap position as shown in Fig. 4 when the pressure on pistons 3 and 4 equalize; 19 is a vent port to keep the pressure in cavity 20 at atmosphere.

The operation of my invention is as follows: Beginning with atmospheric pressure in cylinders 1 and 2 and with the parts in lap position as shown in Fig. 4, the air from the main reservoir is allowed to flow through the train line and cross-over pipe 16 into high pressure cylinder 1 exerting pressure on piston 3 and driving it together with movable parts 4, 5, 6, and 9 into charging position as shown in Fig. 1. While in this position the air flows through feed port 7 into low pressure cylinder 2 and connected chambers until the pressure in said cylinder 2 is sufficient to overcome the pressure on small piston 3 and the resistance of the movable parts and drive them to the left until slide valve 6 closes feed port 7 and the parts stand in lap position as shown in Fig. 4, stopping the flow of air into low pressure cylinder 2. The pressure in cylinders 1 and 2 is in the inverse ratio of the piston area of pistons 3 and 4. This gives a low braking power for light-weight cars and accomplishes the first object of my invention.

To apply the brakes, the pressure in cylinder 1 is reduced sufficiently by allowing the air to escape from the train line and cross-over pipe by means of the engineer's brake valve so that the pressure in low pressure cylinder 2 acting against piston 4 drives it together with valve 9 and other movable parts still further to the left until graduated or service port 10 is opened as shown in Fig. 5. Air then escapes through graduated port 10 from low pressure cylinder 2 until the pressure in cylinder 2 and connected chambers is so reduced as to operate the triple valve for a graduated or service application of the brakes and at the same time to allow the high pressure on piston 3 to drive it and other movable parts into lap position shown in Fig. 4.

In order to release the brakes, the pressure in high pressure cylinder 1 is increased by a charge from the main reservoir through the main train line and cross-over pipe into said cylinder 1. This increase of pressure operating against piston 3 drives it and other movable parts to the right as shown in Fig. 1, opening feed port 7, through which, low pressure cylinder 2 and cross-over pipe 16, the air flows to triple valve, operating the same and causing it to release the brakes; at the same time increasing the pressure in low pressure cylinder 2 and connected chambers until they are charged with sufficient pressure to return the movable parts to lap position shown in Fig. 4.

In order to make an emergency application of the brakes, the pressure in high pressure cylinder 1 is so suddenly and greatly reduced by discharging the air from the train line and cross-over pipe through the engineer's brake valve that the pressure in low pressure cylinder 2 operating against piston 4 drives it together with other movable parts as far as possible to the left to emergency position, opening emergency ports 8 and 11 as shown in Fig. 6. While in this position the discharge of air from the low pressure cylinder 2 and connected chambers through emergency port 11 is sufficiently rapid to give the triple valve a much quicker emergency action than without applicant's mechanism, because the pressure reduction required in the train line to open emergency port 11 is not as great and sudden as that required to give the triple valve emergency action and because in making a reduction of the pressure to obtain emergency action of the triple valve the small volume of air required to be discharged from low pressure cylinder 2 and connected chambers escapes through the emergency port 11 much sooner than it is possible to make the required reduction through the train line alone on account of its length and shape and the many times greater volume of air to be discharged.

The discharge of air through the emergency port 8 empties the train line near the triple as well as at the engineer's brake valve, thereby preventing such a rush of air from the rear end of the train line to the head end as might increase the pressure in the train line along its course sufficient to release an application of brakes on head-end cars just previously made, and reduces the pressure in high pressure cylinder 1 sufficiently rapid to prevent the valves 6 and 9 and other movable parts from returning to lap position as shown in Fig. 4 and closing emergency ports 8 and 11 before the pressure is exhausted. If, however, after my mechanism has been given emergency action as shown in Fig. 6, the engineer should put his brake valve into lap position too soon, the pressure reduction will continue through ports 8 and 11, thereby preventing a failure to apply the brakes or a release if they have been applied. After the emergency brakes have been applied and the pressure in high pressure cylinder 1 and low pressure cylinder 2 has been exhausted, valves 6 and 9 and other movable parts are returned to lap position as shown in Fig. 4 by coil spring 17 and so remain until the brakes are released in the manner explained in a preceding paragraph.

To accomplish the third object of my invention, a sufficient pressure reduction is made in high pressure cylinder as heretofore described to move valves 6 and 9 from position shown in Fig. 5 to position shown in Fig. 6. My mechanism while in this position affords a means for rapid pressure reduction as explained in the preceding paragraph; and although emergency action of the triple valve cannot be had before release of brakes from service application, the rapid pressure reduction with all its advantages as heretofore explained gives the brakes the quickest and most effective additional graduated or service application possible.

The operation of my mechanism to accomplish the fourth object of my invention is as follows: When defective triple goes into emergency, the sudden reduction of the pressure resulting from the emergency action of the triple in cylinder 2 causes the valve 6 to move to the right to the position shown in Fig. 1, so as to open feed port 7 and allow the increase of pressure flowing through said feed port 7 into said large cylinder 2 and connected chambers to release the triple, but owing to the restricted size of feed port 7 the flow of air through it is not sufficiently rapid to reduce the pressure in the train-line so suddenly as to throw other triples into emergency.

When it is desired to apply a high braking power on heavy-weight cars, my pressure reducing valve may be cut out by any desirable means such as an ordinary 3-way valve 13 shown in Fig. 1 closing air passage 12 and opening air passage 15, and in Fig. 3 closing air passage 15 and opening air passage 12 and permitting the air to stand at the same pressure on both sides of my mechanism.

With 3-way valve 13 standing as shown in Fig. 3, my mechanism still accomplishes the second and third objects of my invention, just as when the three-way valve stood in the position shown in Fig. 1; for when the three-way valve stands as in Fig. 3, cylinder 2 is cut off from all other air-chambers, and a reduction of pressure in the train-line 16, air passage 12 and high-pressure cylinder 1 is made, the pressure in cylinder 2 moves the valves 6 and 9 and connected parts to the left, operating the mechanism as already described in connection with the second and third objects of my invention.

Having fully described my invention, what I claim as new and desire to secure by Letters Patent of the United States is:

1. An automatic pressure-reducing valve, comprising a casing consisting of two cylinders of unequal diameters so situated with reference to each other that their centers form a continuous straight line and having ports and connections for the admission and escape of expansive medium, a duct or passage for said expansive medium leading from said small cylinder to said large cylinder, a slide valve situated in said small cylinder operating so as to open and close said duct or passage, and movable means situated in said small and large cylinders and forming an air-tight partition between them automatically operated by varying and resulting pressures on opposite sides thereof and connected with said slide valve to control the movements thereof.

2. An automatic pressure-reducing valve, comprising a casing consisting of two cylinders of unequal diameters so situated with reference to each other that their centers form a continuous straight line and having port and connection at each end for the admission and escape of expansive medium, a movable means situated in said cylinders and serving as an air-tight partition between them and operated by the varying and resulting pressures against the opposite sides of said movable means or partition, a duct or means of communication between said cylinders opening on opposite sides of said movable means or partition for the passage of expansive medium into said large cylinder, and a slide valve situated in said small cylinder, the same being connected to said movable means and operated thereby so as to open and close said duct or means of communication.

3. An automatic pressure-reducing valve, comprising a casing consisting of two cylinders of unequal diameters so situated with reference to each other that their centers form a continuous straight line and having port and connection for the admission and escape of expansive medium at each end, a movable means serving as an air-tight partition between said cylinders said movable means consisting of two pistons of unequal diameters and a piston rod, each piston being immovably mounted upon said rod and reciprocating air-tight in the cylinder of like size, a duct or means of communication between said cylinders opening on opposite sides of said movable means for the passage of expansive medium into said large cylinder, and a slide valve situated in said small cylinder, the same being connected with said piston rod and operated by the varying and resulting pressures against the opposite sides of said pistons so as to open and close said duct or means of communication.

4. An automatic pressure-reducing valve, situated in the crossover pipe of a train-line, comprising a casing consisting of two cylinders of unequal diameters so situated with reference to each other that their centers form a continuous straight line and having port and connection for admission and escape of compressed air at each end said smaller cylinder being situated next to the train line, a movable means reciprocating in said cylinders and serving as an air-tight partition between them, said movable means consisting of pistons of unequal diameters and a piston rod, each piston being immovably mounted upon said rod and operating air-tight in the cylinder of like size, a duct or means of communication between said cylinders opening on opposite sides of said movable means for the passage of compressed air into said large cylinder, and a slide valve situated in said small cylinder, the same being joined to said piston rod and operated by the varying and resulting pressures against the opposite sides of said pistons so as to open and close said duct or means of communication.

5. An automatic pressure-reducing valve, comprising a casing consisting of two cylinders of unequal diameters, so situated with reference to each other that their centers form a continuous straight line and having port and connection at each end for the admission and escape of expansive medium, a duct or passage for expansive medium leading from said small cylinder to said large cylinder, a slide valve operating in said small cylinder so as to open and close said duct or passage, an exhaust port leading from said large cylinder to atmosphere, a slide valve situated in said large cylinder and operating so as to open and close said exhaust port, and movable means reciprocating in said cylinders and forming an air-tight partition between them, said movable means being automatically operated by different pressures on opposite sides thereof and connected with said slide valves and controlling the movements thereof.

6. An automatic pressure-reducing valve, comprising a casing consisting of two cylinders of unequal diameters so situated with reference to each other that their centers form a continuous straight line and having port and connection at each end for the admission and escape of expansive medium, a movable means situated in said cylinders, reciprocating therein and serving as an air-tight partition between them and operated by the varying and resulting pressures against the opposite sides of said movable means, a duct or means of communication between said cylinders opening on opposite sides of said movable means for the passage of expansive medium into said large cylinder, a slide valve situated in said small cylinder, the same being connected to said movable means and operated thereby so as to open and close said duct or means of communication, an exhaust port leading from said large cylinder to atmosphere, and a slide valve situated in said large cylinder, the same being connected to said movable means and operated thereby so as to open and close said exhaust port.

7. An automatic pressure-reducing valve, comprising a casing consisting of two cylinders of unequal diameters so situated with reference to each other that their centers form a continuous straight line and having port and connection at each end for the admission and escape of expansive medium, a movable means situated in said cylinders reciprocating therein and serving as an air-tight partition between them and operated by the varying and resulting pressures against the opposite sides of said means, said means consisting of two pistons of unequal diameters and a piston rod, each piston operating air-tight in the cylinder of like size and immovably mounted upon said rod, a duct or means of communication between said cylinders opening on opposite sides of said pistons for the passage of expansive medium into said large cylinder, a slide valve situated in the said small cylinder, an exhaust port leading from said large cylinder to atmosphere, and a slide valve situated in said large cylinder, said slide valves being connected to said piston rod and operated thereby so as to open and close said duct and said exhaust port.

8. An automatic pressure-reducing valve situated in the cross-over pipe of a train-line comprising a casing consisting of two cylinders of unequal diameters so situated with reference to each other that their centers form a continuous straight line, said smaller cylinder being next to the train-line, and having port and connection at each end for the admission and escape of compressed air, a movable means situated in said cylinders reciprocating therein and serving as an air-tight partition between them and operated by the varying and resulting pressures against its opposing faces, said means consisting of two pistons of unequal diameters and a piston rod, each piston rod being immovably mounted upon said rod and operating air-tight in the cylinder of like size, a duct or means of communication between said cylinders opening on opposite sides of said pistons for the passage of compressed air into said large cylinder, a slide valve situated in said small cylinder, an exhaust port leading from said large cylinder to atmosphere, and a slide valve situated in said large cylinder, said slide valves being connected to said piston rod and operated thereby so as to open and close said duct and said exhaust port.

9. An automatic pressure-reducing valve, comprising a casing consisting of two cylinders of unequal diameters so situated with reference to each other that their centers form a continuous straight line and having port and connection at each end for the admission and escape of expansive medium, a duct or passage for expansive medium leading from said small cylinder to said large cylinder, an exhaust port leading from said small cylinder to atmosphere, a slide valve operating in said small cylinder so as to open and close said duct or passage and said exhaust port, an exhaust port leading from said large cylinder to atmosphere, another and larger exhaust port also leading from said large cylinder to atmosphere, a slide valve situated in said large cylinder and operating so as to open and close said exhaust ports situated in said large cylinder, and movable means reciprocating in said cylinders forming an air-tight partition between said cylinders, said movable means being automatically operated by varying and resulting pressures on opposite sides thereof and connected with said slide valves and controlling the movements thereof.

10. An automatic pressure-reducing valve, comprising a casing consisting of two cylinders of unequal diameters so situated with reference to each other that their centers form a continuous straight line and having port and connection at each end for the admission and escape of expansive medium, a movable means situated in said cylinders reciprocating therein and serving as an air-tight partition between them, said movable means being operated by the varying and resulting pressures against the opposite sides of said movable means, a duct or means of communication between said cylinders opening on opposite sides of said movable means for the passage of expansive medium into said large cylinder, an exhaust port leading from said small cylinder to atmosphere, a slide valve situated in said small cylinder, the same being connected to said movable means and operated thereby so as to open and close said duct and said exhaust port, an exhaust port leading from said large cylinder to atmosphere, another exhaust port larger than said last-mentioned exhaust port but smaller than said first-mentioned exhaust port also leading from said large cylinder to atmosphere, and a slide valve situated in said large cylinder, the same being connected with said movable means and operated thereby so as to open and close said exhaust ports communicating with said large cylinder.

11. An automatic pressure-reducing valve, comprising a casing consisting of two cylinders of unequal diameters so situated with reference to each other that their centers form a continuous straight line and having port and connection at each end for the admission and escape of expansive medium, a movable means situated in said cylinders, reciprocating therein and serving as an air-tight partition between them, the same being operated by the varying and resulting pressures against its opposing faces, said means consisting of two pistons of unequal diameters and a piston rod, each piston operating air-tight in the cylinder of like size and immovably mounted upon said rod, a duct or means of communication between said cylinders opening on opposite sides of said pistons for the passage of expansive medium into said large cylinder, an exhaust port leading from said small cylinder to atmosphere, a slide valve situated in said small cylinder, an exhaust port leading from said large cylinder to atmosphere, another exhaust port larger than said last-mentioned exhaust port but smaller than said first-mentioned exhaust port also leading from said large cylinder to atmosphere, a slide valve situated in said large cylinder, said slide valves being connected with said piston rod and operated thereby so as to open and close said duct and said exhaust ports.

12. An automatic-pressure reducing valve, situated in the cross-over pipe of a train-line, comprising a casing consisting of two cylinders of unequal diameters so situated with reference to each other that their centers form a continuous straight line, said smaller cylinder being next to the train line, and having port and connection at each end for the admission and escape of compressed air, a movable means situated in said cylinders, reciprocating therein and serving as an air-tight partition between them and operated by the varying and resulting pressures against its opposing faces, said means consisting of two pistons of unequal diameters and a piston rod, each piston being immovably mounted upon said rod and operating air-tight in the cylinder of like size, a duct or means of communication between said cylinders opening on opposite sides of said pistons for the passage of compressed air into said large cylinder, an exhaust port leading from said small cylinder to atmosphere, a slide valve situated in said small cylinder, an exhaust port leading from said large cylinder to atmosphere, another exhaust port larger than said last-mentioned exhaust port but smaller than said first-mentioned exhaust port also leading from said large cylinder to atmosphere, and a slide valve situated in said large cylinder, said slide valves being connected to said piston rod and operated thereby so as to open and close said duct and said exhaust ports.

13. An automatic pressure-reducing valve, situated in the cross-over pipe of a train-line, comprising a casing consisting of two cylinders of unequal diameters so situated with reference to each other that their centers form a continuous straight line and having port and connection at each end for the admission and escape of compressed air, said smaller cylinder being next to the train-line, a means of communication for the passage of compressed air leading from said small cylinder around said large cylinder to the cross-over pipe adjoining said large cylinder, a manually operated means situated at the junction of said large cylinder and cross-over pipe closing the communication between said large cylinder and cross over pipe and opening the passage between said duct and cross-over pipe, a movable means situated in said cylinders reciprocating therein and serving as an air-tight partition between them and operated by the varying and resulting pressures against its opposing faces, said means consisting of two pistons of unequal diameters and a piston rod, each piston being immovably mounted upon said rod and operating air-tight in the cylinder of like size, a duct or means of communication between said cylinders opening on opposite sides of said pistons for the passage of compressed air into said large cylinder, an exhaust port leading from said small cylinder to atmosphere, and a slide valve situated in said small cylinder and connected to said piston rod and operated thereby so as to open and close said duct and said exhaust port.

14. An automatic pressure-reducing valve, situated in the cross-over pipe of a train line, comprising a casing consisting of two cylinders of unequal diameters so situated with reference to each other that their centers form a continuous straight line and having port and connection at each end for the admission and escape of compressed air, said smaller cylinder being next to the train-line, a means of communication for the passage of compressed air leading from said small cylinder around said large cylinder to the cross-over pipe adjoining said large cylinder, a manually operated means situated at the junction of said large cylinder and cross-over pipe closing the communication between said large cylinder and cross-over pipe and opening the passage between said duct and cross-over pipe, a movable means situated in said cylinders reciprocating therein and serving as an air-tight partition between them and operated by the varying and resulting pressures against its opposing faces, said means consisting of two pistons of unequal diameters and a piston rod, each piston being immovably mounted upon said rod and operating air-tight in the cylinder of like size, a duct or means of communication between said cylinders opening on opposite sides of said pistons for the passage of compressed air into said large cylinder, an exhaust port leading from said small cylinder to atmosphere, a slide valve situated in said small cylinder, an exhaust port leading from said large cylinder to atmosphere, and a slide valve situated in said large cylinder, said slide valves being connected to said piston rod and operated thereby so as to open and close said duct and said exhaust ports.

In witness whereof, the said applicant ANDREW T. JOHNSON has hereunto subscribed his name in the presence of the undersigned witnesses, this 27th day of February, 1907.

ANDREW T. JOHNSON.

Witnesses:
 WALTER SHELTON,
 F. A. STEVENS.